United States Patent [19]

Allen

[11] 4,290,540
[45] Sep. 22, 1981

[54] FOLDABLE BICYCLE CARRIER

[76] Inventor: Richard A. Allen, Bowles Ter., Lincoln, Mass. 01773

[21] Appl. No.: 110,982

[22] Filed: Jan. 10, 1980

Related U.S. Application Data

[60] Continuation-in-part of Ser. No. 914,156, Jun. 9, 1978, abandoned, which is a division of Ser. No. 699,495, Jun. 24, 1976, Pat. No. 4,109,839.

[51] Int. Cl.³ .............................................. B60R 9/10
[52] U.S. Cl. ............................. 224/314; 224/42.03 B; 224/321
[58] Field of Search ............... 224/314, 309, 321, 324, 224/329, 42.03 B; 414/462; 280/769; 211/17, 18, 21

[56] References Cited

U.S. PATENT DOCUMENTS

| | | | |
|---|---|---|---|
| 3,437,248 | 4/1969 | Allen | 224/309 X |
| 3,877,622 | 4/1975 | McLain | 224/42.03 B |
| 3,927,810 | 12/1975 | Danon | 224/29 R |
| 3,927,811 | 12/1975 | Nussbaum | 224/314 X |
| 4,050,616 | 9/1977 | Mosow | 224/42.03 B |
| 4,057,182 | 11/1977 | Kolkhorst et al. | 224/42.45 R |
| 4,085,874 | 4/1978 | Graber | 224/321 |
| 4,109,839 | 8/1978 | Allen | 224/42.03 B X |

*Primary Examiner*—Steven M. Pollard
*Attorney, Agent, or Firm*—Herbert L. Bello

[57] ABSTRACT

A foldable carrier for carrying objects on an automobile includes a pair of side members, a pair of carrying members and a pair of brackets. One of each pair of side members and one of each pair of carrying members is mounted to one of each pair of brackets for relative movement between a flat collapsed position and an erect extended position, the brackets being held apart by a cross member. Each side member is constrained for biaxial movement relative to each carrying member. Attaching hardware is provided for fastening the carrier to an automobile and for locking the carrier in the extended position.

10 Claims, 9 Drawing Figures

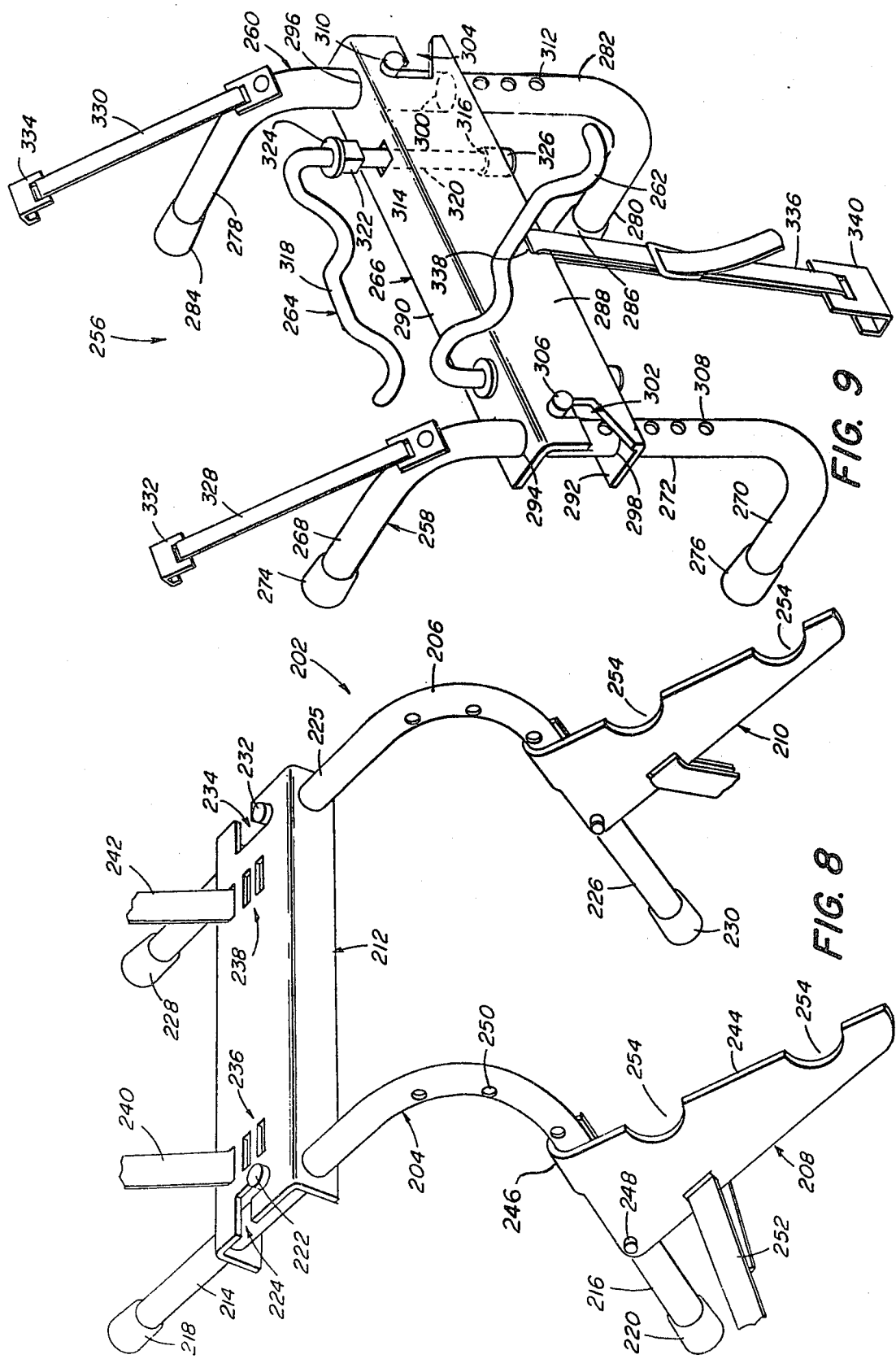

FOLDABLE BICYCLE CARRIER

CROSS-REFERENCES TO RELATED APPLICATIONS

This application is a continuation-in-part of application Ser. No. 914,156, filed June 9, 1978, now abandoned, which is a division of application Ser. No. 699,495, filed June 24, 1976, now U.S. Pat. No. 4,109,839.

BACKGROUND OF THE INVENTION

1. Field of Invention

The present invention relates to carriers for carrying such objects as bicycles, skis, luggage and the like and, more particularly, is directed towards foldable carriers of the foregoing type that are configured to be attached to motor vehicles.

2. Description of the Prior Art

In recent years, the popularity of bicycle riding for sport, recreation and transportation has increased. Bicycle carriers of various configurations have been designed which enable the bicycle owner to transport one or more bicycles from place to place by means of his automobile. Certain ones of these carriers are intended for permanent mounting to the vehicle and other carriers are configured to be mounted and demounted readily. The later type, for example U.S. Pat. No. 3,927,811 of Nussbaum, is collapsible to a limited extent for storage when not in use. Such carriers have been introduced with varying degrees of success. A need has arisen for an automobile carrier which can be mounted and demounted easily and which can be collapsed into a flat configuration for easy storage.

SUMMARY OF THE INVENTION

It is an object of the present invention to provide a foldable carrier which can be easily mounted or demounted from a motor vehicle and which can be folded into a relatively flat configuration for easy storage. The foldable carrier includes a pair of side members, a pair of carrying members and a pair of brackets. One of each pair of side members and one of each pair of carrying members is mounted to one of each pair of brackets for relative movement between an extended position and a collapsed position, the pair of brackets held apart in fixed spaced relationship by a cross member. Each side member, which includes a bent portion defining a supporting leg, is constrained for biaxial movement relative to each carrying member to permit the carrier to assume a substantially flat collapsed configuration for storage and a substantially erect extended position when in use. Each bracket is formed with a notch which cooperates with a latch on its associated side member to captively hold the foldable carrier in the extended position. Attaching hardware is provided for locking the side members and carrying members against relative movement and for fastening the carrier to the motor vehicle.

Other objects of the present invention will in part be obvious and will in part appear hereinafter.

The invention accordingly comprises the apparatuses and systems, together with their parts, elements and interrelationships that are exemplified in the following disclosure, the scope of which will be indicated in the appended claims.

BRIEF DESCRIPTION OF THE DRAWINGS

A fuller understanding of the nature and objects of the present invention will become apparent upon consideration of the following detailed description taken in connection with the accompanying drawings, wherein:

FIG. 8 is a perspective view of a further embodiment of the invention; and

FIG. 9 is a perspective view of a still further embodiment of the invention.

DETAILED DESCRIPTION OF THE PREFERRED EMBODIMENTS

Figure 1:
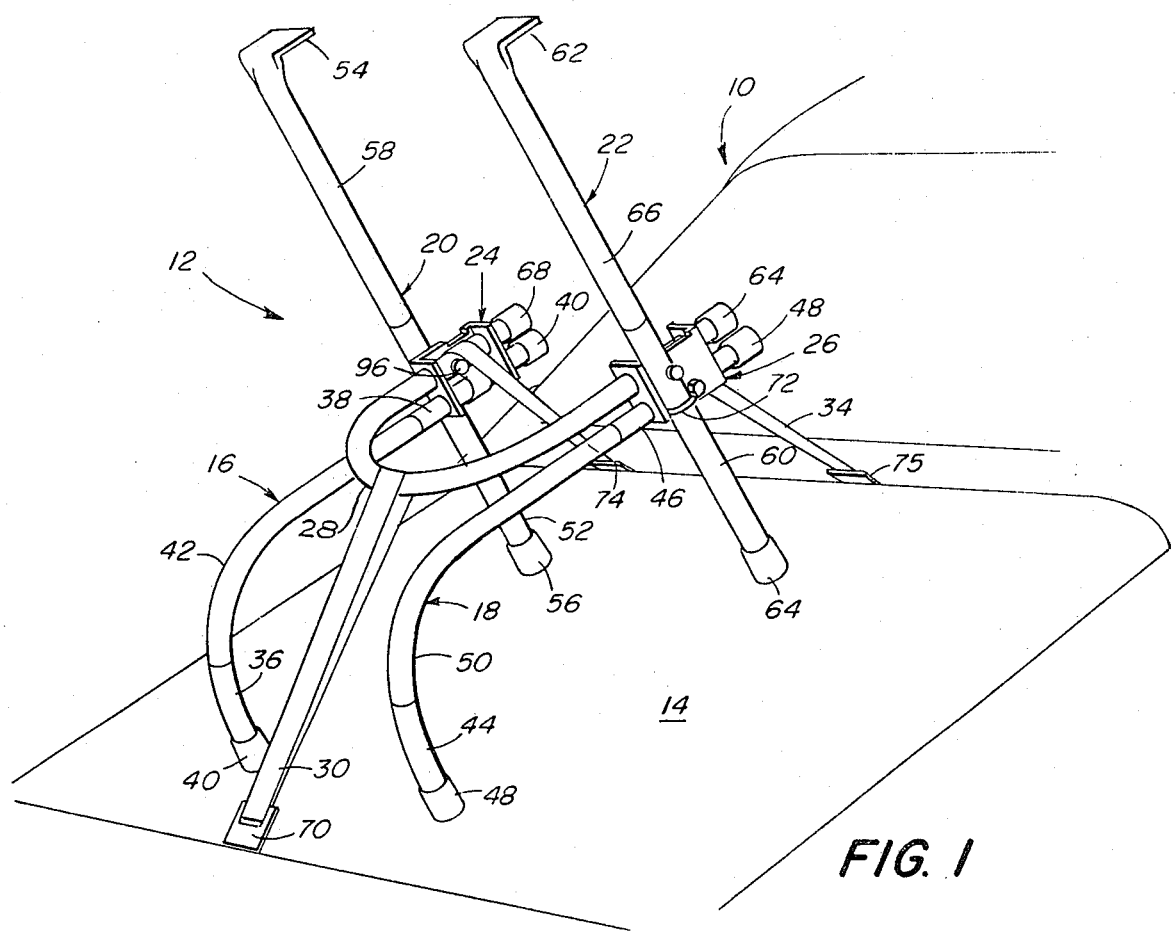
FIG. 1 is a perspective view of a foldable carrier embodying the invention in an extended position mounted on an automobile trunk.

Referring now to the drawings, particularly FIG. 1, there is shown an automobile 10 with a foldable carrier 12 embodying the present invention attached to a lid 14 of the automobile. Foldable carrier 12, shown in its erect extended position, includes a pair of side members 16, 18 and a pair of carrying members 20, 22 that are interconnected by means of brackets 24, 26. A cross member 28 is provided for holding brackets 24 and 26 apart. Attaching hardware such as a rearward strap 30 and forward straps 32, 34 fasten carrier 12 to automobile 10.

Side member 16, for example a hollow metal pipe, includes a first leg portion 36 and a second leg portion 38 defining a substantially L-shaped member having protective plastic or rubber caps 40 covering its ends. Portions of side member 16 intermediate protective caps 40 may be provided with a protective covering 42 such as a section of plastic tubing or the like. Side member 18, for example a hollow metal pipe, includes a first leg portion 44 and a second leg portion 46 defining a substantially L-shaped member having protective plastic or rubber caps 48 covering its ends. Portions of side member 18 intermediate caps 48 may be covered with a protective covering 50 such as a section of plastic tubing or the like. For simplicity, convenience and economy, side members 16 and 18 are like parts that are interchangeable.

Carrying member 20, for example a hollow metal pipe, includes an elongated first leg portion 52 and an abbreviated second leg portion 54 defining a substantially L-shaped member. The free end of first leg portion 52 is provided with a protective plastic or rubber cap 56. A suitable protective covering 58 such as plastic tubing or the like may cover second leg portion 54 and parts of first leg portion 52. Carrying member 22, for example a hollow metal pipe, includes an elongated first leg portion 60 and an abbreviated second leg portion 62 defining a substantially L-shaped member. The free end of first leg portion 60 is provided with a protective plastic or rubber cap 64. A suitable protective covering 66 such as plastic tubing or the like may cover second leg portion 62 and parts of first leg portion 60. For simplicity, convenience and economy, carrying members 20 and 22 are like parts that are interchangeable.

Cross member 28, for example a hollow metal pipe, is a substantially U-shaped member having protective plastic or rubber caps 68 at its ends. Opposite ends of cross member 28 are fastened to brackets 24 and 26 for maintaining the brackets in spaced relationship to one another.

As hereinafter described, side member 16, carrying member 20 and one end of cross member 28 are interconnected by means of bracket 24 in such a manner that side member 16 is constrained for biaxial movement relative to carrying member 20. Similarly, side member 18, carrying member 22 and the other end of cross member 28 are interconnected by means of bracket 26 in such a manner that side member 18 is constrained for biaxial movement relative to carrying member 22. In the erect extended position of carrier 10 shown in FIG. 1, protective caps 40 and 48 on first leg portions 36 and 44, respectively, and protective caps 56 and 64 on first leg portions 52 and 60, respectively, rest on lid 14 of automobile 10. Strap 30, which is threaded about cross member 28, is provided with a suitable clip 70 configured to engage lid 14 or the bumper of automobile 10. Straps 32 and 34, which are attached to rings 71 and 72 slidably received on carrying members 20 and 22, respectively, are provided with suitable clips 74 and 75 that are adapted to engage lid 14. As hereinafter described, carrying members 20 and 22 captively hold side members 16 and 18 in the extended position and rings 71 and 72 the carrying members in the extended position. The manner in which bicycles or other objects are carried by carrier 12 is similar to the showings in my U.S. Pat. No. 3,710,999, incorporated herein by reference. The automobile carrier disclosed in the foregoing patent is collapsible to a certain extent by disassembling certain members. The present invention is collapsible to a substantially flat configuration by the biaxial movement of side members 16 and 18 relative to carrying members 20 and 22. In the illustrated embodiment, ths relative movement of the side members and carrying members is provided by the novel arrangement of brackets 24, 26, side members 16, 18 and carrying members 20, 26. The details of bracket 24, which is like bracket 26 and interchangeable therewith, is shown in FIG. 6.

Figure 6:
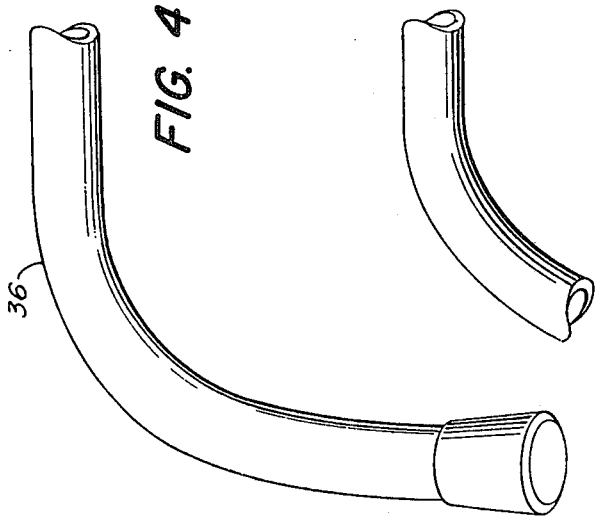
FIG. 6 is a detailed perspective of the bracket for interconnecting the side members and carrying members.
Figure 6:
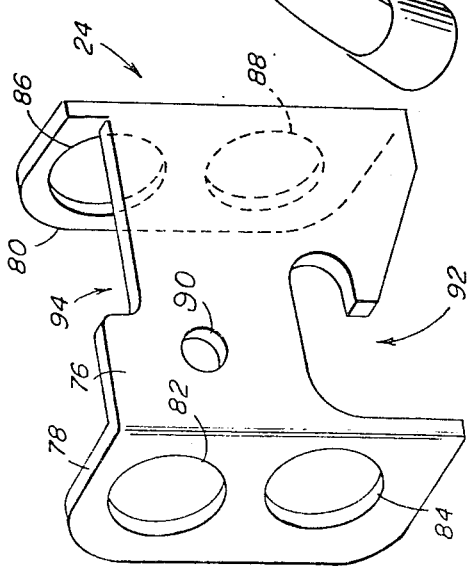

Referring now to FIG. 6, it will be seen that bracket 24, which is composed of a relatively rigid metal or plastic, includes a base portion 76 and a pair of flanges 78 and 80 defining a substantially U-shaped member. Flanges 78 and 80 extend substantially perpendicular from opposite ends of base portion 76. Flange 78 is formed with a pair of through holes 82 and 84 that are aligned with through holes 86 and 88, respectively, formed in flange 80. Cross member 28 is received in aligned holes 82, 86 and side member 16 is received in aligned holes 84, 88. Base portion 76 is formed with a through hole 90, a somewhat J-shaped notch 92 and a U-shaped notch 94. As best shown in FIG. 3, carrying member 16 is rotatably mounted to bracket 24 by means of a pin or bolt 96 which extends through hole 90 and a hole (not shown) formed in the carrying member. A stop 98, for example a nut and bolt assemblage, is fastened to side member 16 between flanges 78 and 80. A similar type configuration is provided for mounting side member 18, carrying member 22 and cross member 28 to bracket 26. The arrangement just described permits carrier 12 to be readily collapsible between the extended position shown in FIG. 1 and the folded position shown in FIG. 2.

Figure 2:
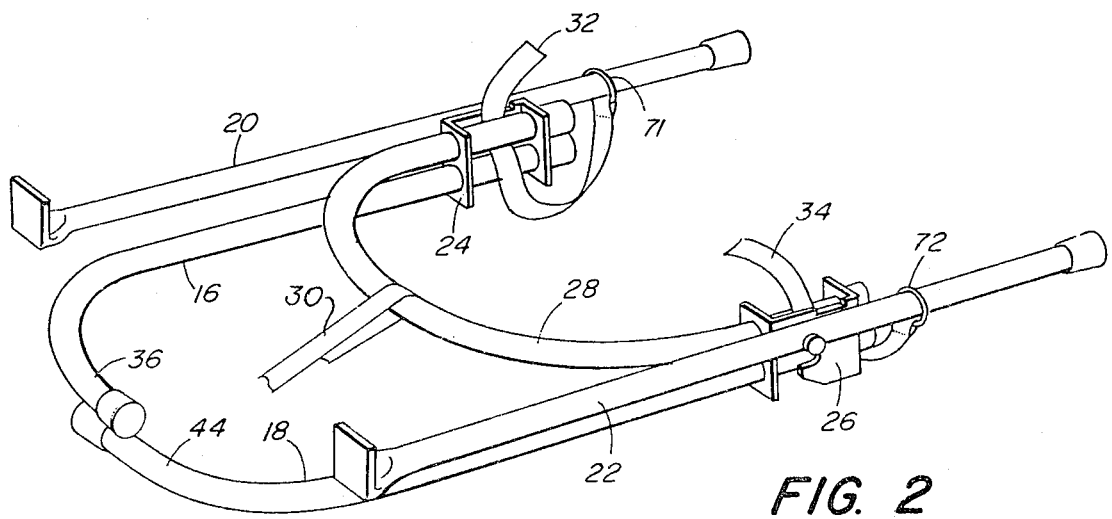
FIG. 2 is a perspective view of the carrier of FIG. 1 in its flat collapsed position.
Figure 3:
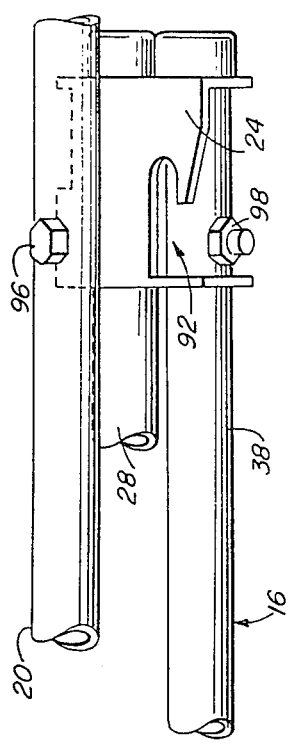
FIG. 3 is a detailed perspective view showing one of the side members and one of the carrying members in the collapsed position.

In the folded or flat position of FIG. 2, carrying members 20 and 22 are substantially parallel to second leg portions 38 and 46 of side members 16 and 18, respectively. First leg portions 36 and 44 of side members 16 and 18, respectively, are turned inwardly towards one another. In the illustrated embodiment, by way of example, the diameter of each side member 16, 18, each carrying member 20, 22 and cross member 28 is approximately twenty millimeters; the diameter of each hole 82, 84, 86 and 88 is approximately twenty-four millimeters; and the height of each bracket 24, 26 is approximately sixty-three millimeters. In the collapsed position, the height of carrier 12 is approximately equal to the height of brackets 24 and 26. The steps of unfolding carrier 12 from the flat collapsed position of FIG. 2 to the extended position of FIG. 1 are illustrated in FIGS. 3, 4 and 5.

Figure 4:
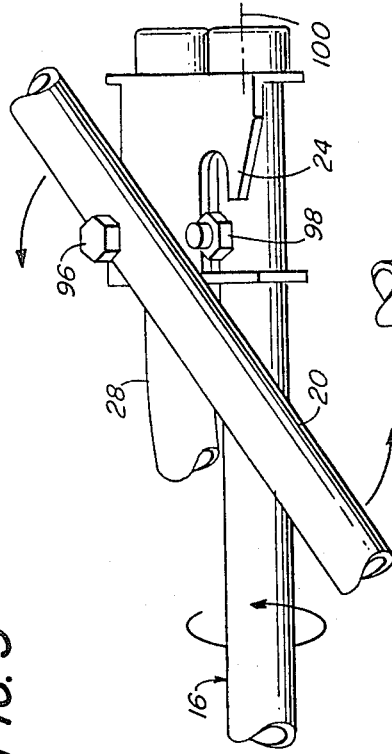
FIG. 4 is a detailed perspective view showing the side member of FIG. 3 moved to an intermediate position.
Figure 5:
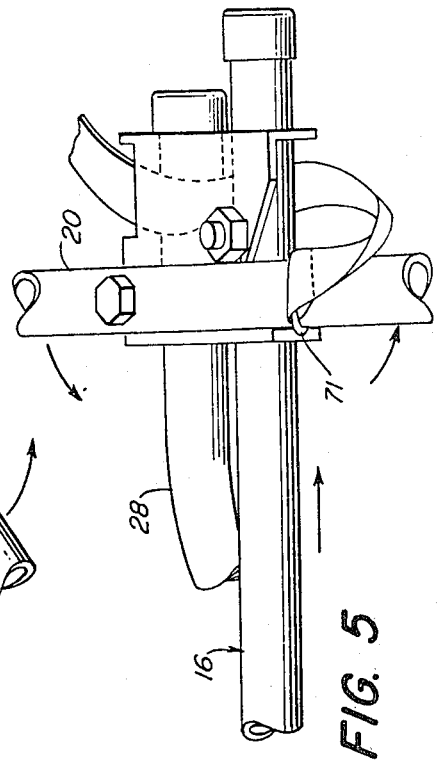
FIG. 5 is a detailed perspective view showing the side member and the carrying member of FIG. 4 moved to the extended position.

For clarity, only one side of folding carrier 12 is shown in FIGS. 3, 4 and 5. It is to be understood that the other side of folding carrier is operated in the same manner as that now to be described. FIG. 3 shows side member 16 and carrying member 20 in the collapsed position. FIG. 4 illustrates an intermediate position in which first leg portion 36 of side member 16 has been rotated about an axis 100, i.e., the longitudinal axis of second leg portion 38, until stop 98 is in position to be received within notch 92. In addition, carrying member 20 is rotated about pin 96. Next, shown in FIG. 5, carrying member 20 is rotated further until it engages and forces stop 98 into notch 92, side member 16 sliding toward the right as stop 98 is pushed into notch 92. It will be readily appreciated that side member 16 is fixed against rotational movement when stop 92 is received within notch 92. Next, ring 71 is moved upwardly on carrying member 20 until it rests between flange 78 and the carrying member, whereby carrying member 20 is locked in position by ring 71. It is to be noted that strap 32 is threaded between side member 16 and cross member 28. Finally, straps 30, 32 and 34 are attached to suitable portions of automobile 10.

Folding carrier 12 is moved from the extended position to the collapsed position by reversing the foregoing steps. After straps 30, 32 and 34 have been released, ring 71 is moved downwardly to unlock carrying member 20. Then, carrying member is rotated about pin 96 away from stop 98. Next, side member 20 is pulled towards the left as viewed in FIG. 5, whereby stop 98 is disengaged from notch 92. Finally, side member 16 is rotated such that stop 92 moves away from notch 92.

In the foregoing discussion of operation of carrier 12 between the extended and collapsed positions, both carrying member 20 and side member 16 were relatively rotated, the carrying member being rotated about an axis of pin 96 and the side member being rotated about the longitudinal axis of its second leg portion 38. If carrying member 20 is held in a fixed position, then side member 16 is moved about two axes relative to the carrying member, one of the axes being the axis of pin 98 and the other axis being the longitudinal axis of second leg portion 38. Similarly, if side member 16 is held in a fixed position, carrying member is rotated about two axes.

Figure 7:
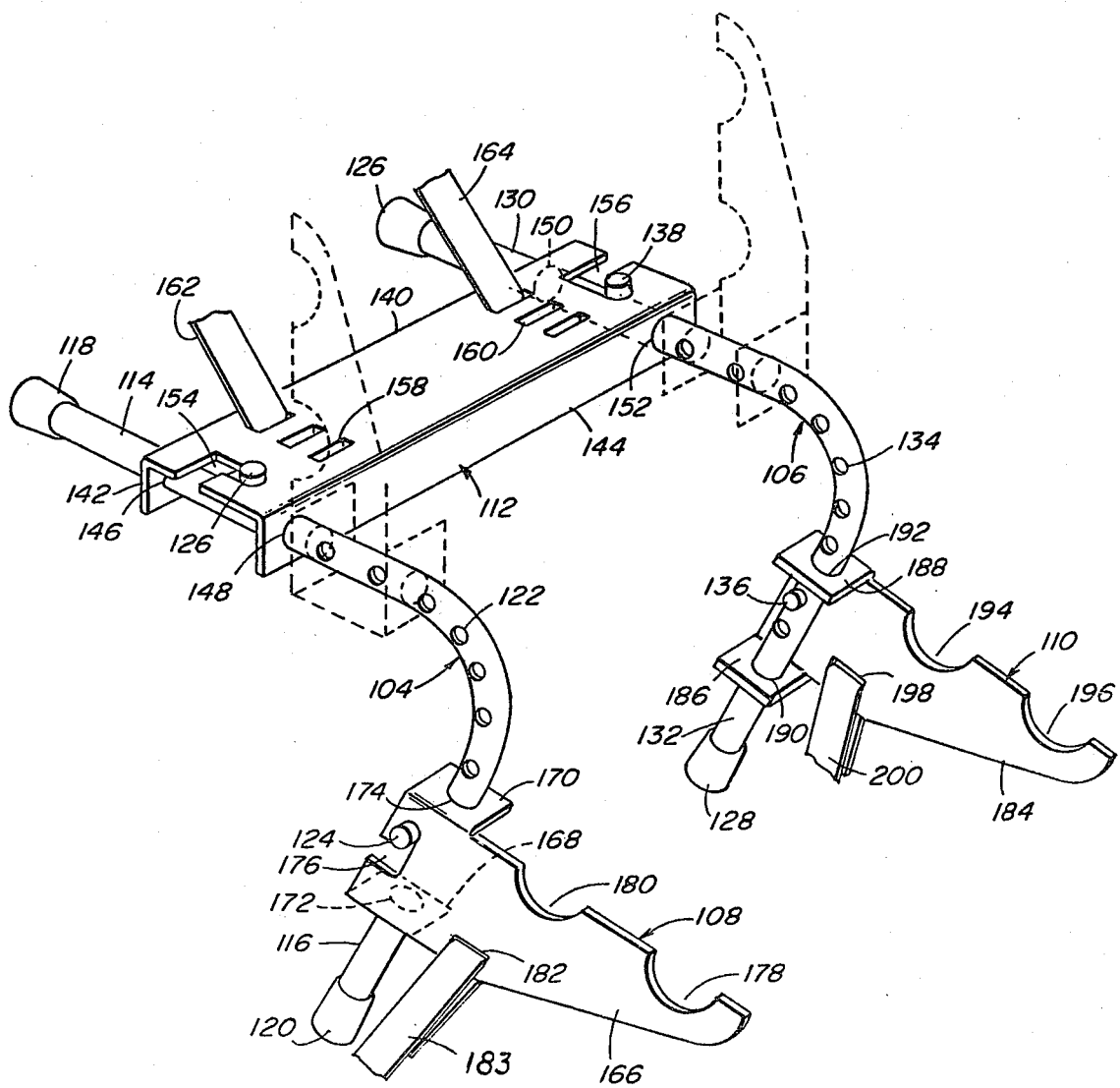
FIG. 7 is a perspective view of an alternative embodiment of the invention.

Referring now to FIG. 7, there is shown an alternative embodiment of the invention in the form of a foldable carrier 102 which includes a pair of side members 104 and 106, a pair of carrying members 108 and 110, and a cross member 112. As hereinafter described, side members 104, 106 and carrying members 108, 110 are relatively movable from the illustrated extended position to a substantially flat position.

Side member 104, for example a hollow metal pipe, includes a first leg portion 114 and a second leg portion 116 defining a substantially C-shaped member having protective plastic or rubber end caps 118 and 120 which rest on the lid of an automobile. Portions of side member 104 intermediate end caps 118 and 120 are formed with a plurality of holes 122 which are configured to receive a pin or bolt 124 for locking carrying member 108 and side member 104 against relative movement. A pin or bolt 126 is provided for locking side member 104 and cross member 112 against relative movement.

Side member 106, for example a hollow metal pipe with protective plastic or rubber end caps 126 and 128, includes a first leg portion 130 and a second leg portion 132 defining a substantially C-shaped member. Portions of side member 106 intermediate end caps 126, 128 are formed with a plurality of holes 134 which are adapted to receive a pin or bolt 136 for locking carrying member 110 and side members 106 against relative movement. A pin or bolt 138 is provided for locking side member 106 and cross member 112 against relative movement. It will be apparent that side members 104 and 106 are interchangeable members.

Cross member 112, for example a relatively rigid metal or plastic bracket having a substantially U-shaped profile in right cross section, includes a base 140 and a pair of flanges 142, 144. A pair of aligned holes 146 and 148 formed in flanges 142 and 144 respectively, are adapted to receive side member 104. A pair of aligned holes 150 and 152 for side member 106 are provided in flanges 142 and 144, respectively. Opposite ends of base 140 are formed with substantially L-shaped reentrant notches 154 and 156 which are adapted to receive bolts 126 and 138, respectively. Base 140 is also formed with slots 158 and 160 which are configured to receive straps 162 and 164, respectively, the slots being intermediate reentrant notches 154 and 156.

Carrying member 108 includes a carrying arm 156 and a pair of flanges 168 and 170 having aligned holes 172, 174 adapted to receive side member 104. The end of carrying arm 156 adjacent flanges 168, 170 is formed with a substantially L-shaped reentrant notch 176. The upper side of carrying arm 166 as viewed in FIG. 7 is provided with a pair of substantially semicircular reentrant openings 178, 180 which constitute grips for an object carried by carrier 102. Carrying arm 166 is also formed with a slot 182 for a strap 183.

Carrying member 110, which is similar to and interchangeable with carrying member 108, includes a carrying arm 184 and a pair of flanges 186 and 188. A pair of aligned holes 190 and 192 that are adapted to receive side member 106 are formed in flanges 186 and 188, respectively. Although not shown, a substantially L-shaped reentrant notch which corresponds to notch 176 is provided in carrying member 110. The upper side of carrying arm 184 is formed with a pair of semicircular reentrant openings 194, 196 which constitute grips for an object carried by carrier 102. A slot 198 is provided for a strap 200.

As previously indicated, foldable carrier 102 is shown in its extended position. Bolts 124 and 136 engage their respective reentrant openings in carrying members 108 and 110 for constraining the carrying members against rotation with respect to side members 104 and 106. Straps 183 and 200 are attached to appropriate portions of the automobile for locking carrying members 108 and 110. As shown by the dashed lines, the carrying members can be moved to and locked in a plurality of positions on the side members, bolts 124 and 136 being moved to appropriate ones of holes 122 and 134. Bolts 126 and 138 engage their respective reentrant openings in cross member 122 for constraining side members 104 and 106 against rotation relative to the cross member. Straps 162 and 164 are attached to appropriate portions of the automobile for locking side members 104 and 106.

Foldable carrier 102 is placed in its retracted or flat position by first disconnecting straps 162, 164, 183 and 200 from the automobile. Next, side members 104 and 106 are moved towards the left relative to cross member 112, whereby bolts 126 and 138 are free to move in their respective reentrant notches. Then, side members 104 and 106 are rotated so that second leg portions 116 and 132 are turned inwardly towards one another. Finally, carrying members 108 and 110 are lifted upwardly and rotated inwardly towards one another to form a flat package. It will be readily apparent that foldable carrier 102 is erected by reversing the foregoing steps.

A foldable carrier 202 shown in FIG. 8 is an alternative embodiment of foldable carrier 102 and includes a pair of side members 204 and 206, a pair of carrying members 208 and 210, and a cross member 212. As hereinafter described, side members 204 and 206 are movable relative to cross member 212 and carrying members 208 and 210 are movable relative to the side members. Foldable carrier 202 is movable between an erect extended position shown in FIG. 8 and a flat collapsed position.

Side member 104, for example a hollow metal pipe, includes a first leg portion 214 and a second leg portion 216 defining a substantially C-shaped member having protective plastic or rubber end caps 218 and 220 which rest on the lid of an automobile. A bolt or pin 222 which is mounted to first leg portion 214 engages a substantially L-shaped reentrant notch 224 formed in cross member 212 and constrains side member 104 against rotation relative to the cross member in a similar manner discussed in connection with foldable carrier 102.

Side member 106, which is similar to and interchangeable with side member 104 includes a first leg portion 225 and a second leg portion 226 defining a substantially C-shaped member having protective plastic or rubber end caps 228 and 230 which rest on the lid of an automobile. A bolt or pin 232 which is mounted to first leg portion 224 engages a substantially L-shaped reentrant notch 234 formed in cross member 212 at an end opposite notch 224 for constraining side member 106 against rotation relative to the cross member. A series of slots 236 and 238 formed in cross member 212 intermediate notches 222 and 234 define adjustment locations for a pair of straps 240 and 242 that are configured to be attached to the automobile. The manner in which side members 204 and 206 are moved between the extended and collapsed position is the same as described in connection with side members 104 and 106 of carrier 102.

Carrying member 208 includes a carrying arm 244 having a substantially hooked shaped flange 246 at a rearward position. Carrying arm 244 is pivotally mounted to side member 204 by means of a pin or bolt 248 which is received in one of a series of holes 250 formed in second leg portion 216. A strap 252, which is fastened to a slot 254 in carrying arm 244 and is configured to be attached to appropriate portions of the automobile, holds carrying member in the extended position, flange 246 engaging second leg portion 216. When strap 252 is detached from the automobile, carrying member 208 is free to rotate about pin 248 into its folded or collapsed position. Carrying member 210 is similar to and interchangeable with carrying member 208. It is to be noted that carrying members 208 and 210 are provided with semicircular openings 254 which constitute grips for an object to be carried by foldable carrier 202.

Referring now to FIG. 9, there is shown a foldable carrier 256 comprising a pair of side members 258 and 260, a pair of carrying members 262 and 264, and a cross member 266. Side member 258, for example a hollow metal pipe, includes a first leg portion 268, a second leg portion 270 and an intermediate portion 272 defining a substantially U-shaped member. The free ends of leg portions 268 and 270, which are configured to rest on a lid of an automobile, are provided with protective plastic or rubber caps 274 and 276, respectively. Side members 260, for example a hollow metal pipe, includes a first leg portion 278, a second leg portion 280 and an intermediate portion 282 defining a substantially U-shaped member. The free ends of leg portions 278 and 280, which are adapted to rest on the lid of an automobile, are provided with plastic or rubber caps 284 and 286, respectively.

Cross member 266, for example a substantially U-shaped channel member composed of a relatively rigid plastic or metal, includes a base portion 288 having a pair of flanges 290 and 292 on opposite sides thereof. Flange 290 is formed with a pair of holes 294 and 296 which are in alignment with a pair of holes 298 and 300, respectively, formed in flange 292. Aligned holes 294 and 298 are adapted to receive intermediate portion 272 and aligned holes 296 and 300 are adapted to receive intermediate portion 282. Opposite ends of base portion 288 are formed with substantially J-shaped notches 302 and 304. Notch 302 is configured to receive a bolt or pin 306 which is mounted in one of a series of holes 308 provided in intermediate portion 272. Notch 304 is adapted to receive a bolt or pin 310 which is mounted in one of a series of holes 312 formed in intermediate portion 282. Holes 308 and 312 constitute adjustment means for positioning of cross member 266 relative to side members 258 and 260. Flange 290 is formed with a pair of substantially rectangular openings 314, one of which is shown, and flange 292 is formed with a pair of substantially circular openings 316, one of which is shown. Rectangular openings 314 are intermediate holes 294 and 296, each one of the rectangular opening being adjacent one of the holes. Circular openings 316 are in alignment with rectangular openings 314. Aligned openings 314 and 316 are adapted to receive carrying members 262 and 264.

Carrying member 262 is shown in a locked position and carrying member 264 is shown in an unlocked position. Carrying members 262 and 264 are similar and interchangeable with one another. Carrying member 262, for example a bent metal rod, includes a carrying arm 318 and a body 320. The upper end of body 320 is provided with a collar 322 having an enlarged head 324. Collar 322 is adapted to be received within opening 314 and prevents rotational movement of carrying member 264 relative to cross member 266, head 324 being larger than opening 314. The lower end of body 320, which extends through opening 316, is provided with a biasing member 326, for example a spring. Spring 326, which is held between flange 92 and the lower end of body 320, provides sufficient force to hold collar 322 within opening 314 when carrying member 264 is in the locked collapsed or locked extended positions. Carrying member 264 is moved between its locked extended position and its locked collapsed by first pulling carrying arm 318 upwardly until collar 322 disengages opening 314, spring 326 being compressed between flange 92 and the lower end of body 320, and then rotating the carrying arm perpendicular or parallel to cross member 266. Similarly, carrying member 264 is moved between its locked collapsed position and its locked extended position by first pulling carrying arm 318 upwardly until collar 322 is disengaged from opening 314 and then by rotating the carrying arm until it is substantially perpendicular or parallel to cross member 266. When carrying member 264 is released, spring 326 pulls collar 322 into opening 314. That is, when carrying arm 318 is pulled upwardly, spring 320 is compressed between the lower face of flange 292 of cross member 266 and the lower end of body 320; and when the carrying arm is released, the spring expands and exerts sufficient force to hold collar 322 into locking engagement with opening 314.

Side members 258 and 260 are moved from the extended position shown in FIG. 9 to the collapsed or folded position by first pushing the side members downwardly with respect to cross member 266 and then rotating the side members inwardly towards one another. A pair of straps 328 and 330, which are adapted to be attached to suitable portions of the automobile by means of fasteners 332 and 334, for example clips, are mounted to first leg portions 268 and 278, respectively. A strap 336 is threaded through a slot 338 formed in base 288. A clip 340 is provided on trap 336 for attachment to an appropriate portion of the automobile. It is to be noted that strap 336, in addition to holding foldable carrier 256 to the automobile, pulls downwardly on cross member 266 and locks pins 306 and 310 in notches 302 and 304.

Since certain changes may be made in the foregoing disclosure without departing from the scope of the invention herein involved, it is intended that all matter contained in the above description and depicted in the accompanying drawings be construed in an illustrative and not in a limiting sense.

What is claimed is:

1. A foldable carrier mountable on automobiles or the like, said carrier comprising:
    (a) a pair of side members;
    (b) a pair of carrying members, each said carrying member including a carrying arm and a body; and
    (c) means for interconnecting said side members and said carrying members, each said side member and each said carrying member constrained for both slidable and rotational movement along and about parallel axes relative to said interconnecting means between extended and collapsed positions.

2. The foldable carrier as claimed in claim 1 wherein each side member includes a first leg portion and a second leg portion defining a substantially C-shaped member, said first and second leg portions configured to rest on a surface of the automobile when said side members are in said extended positions, said first and second leg portions of each said side member and said carrying arm of each said carrying member being substantially perpendicular to a longitudinal axis of said interconnecting means when in their extended position, said first and second leg portions of each said side member and said carrying arm of each said carrying member being substantially parallel to said longitudinal axis of said interconnecting means when in their collapsed position.

3. The foldable carrier as claimed in claim 1 wherein said interconnecting means includes a cross member, each of said side members rotatably received in said cross member, said cross member captively holding said side members in fixed spaced relationship.

4. The foldable carrier as claimed in claim 3 wherein one of said carrying members is mounted to one of said second leg portions of one of said side members and the other of said carrying members is mounted to the other of said second leg portions of the other of said side members.

5. The foldable carrier as claimed in claim 4 wherein each said carrying member is formed with a first opening configured to receive a stop and a second opening defining a grip for an object to be carried by said carrier.

6. A foldable carrier mountable on automobiles or the like, said carrier comprising:
    (a) a pair of side members;
    (b) a pair of carrying members; and
    (c) cross means interconnecting said side members and said carrying members, each said side member constrained for rotational and slidable movement about and along parallel axes between an extended position and a collapsed position with respect to said cross means while interconnected to said cross means;
    (d) each said carrying member including a collar configured to engage and to disengage said cross means, each said carrying member in a locked position and fixed against movement relative to said cross means when said collar engages said cross means, said side members and said carrying members substantially perpendicular to a longitudinal axis of said cross means when in said extended position, said side members and said carrying members substantially perpendicular to said longitudinal axis of said cross means when in said collapsed position.

7. The foldable carrier as claimed in claim 6 including a pair of locking means for locking each of said side members in its extended position, each said locking means including a substantially J-shaped notch having an opened portion and a closed portion formed at an end of said cross means and a pin extending from each of said side members, one of each said notches extending from each of said side members, one of each said notches configured to receive one of each said pins, each said side member constrained for limited slidable movement and fixed against rotatable movement when said pin of that side member is received in said notch, each said side member constrained for rotatable movement and fixed against slidable movement when said pin of that side is in said open portion of said notch, said side member in its locked position when said pin is received in said closed portion of said notch, each of said side members and each of said carrying members are independently movable relative to said cross means.

8. A foldable carrier mountable on automobiles or the like, said carrier comprising:
    (a) a pair of side members;
    (b) a pair of carrying members;
    (c) cross means interconnecting said side members and said carrying members, said side members constrained for movement between an extended locked position and a collapsed locked position with respect to said cross means, said carrying members constrained for movement between an extended position and a collapsed position with respect to said cross means; and
    (d) bias means in engagement with said carrying means for constraining said carrying means in said extended and collapsed positions;
    (e) each said carrying member including a collar configured to engage and disengage said cross means, each said carrying member in a locked position and fixed against movement relative to said cross means when said collar engages said cross means.

9. The foldable carrier as claimed in claim 8 wherein each said carrying member is constrained pivoting movement between said extended position and said collapsed position, each said carrying member pivoted from said extended position to said collapsed position by pulling said carrying member away from said cross member for disengaging said collar and said cross means and pivoting said carrying member relative to said cross means.

10. The foldable carrier as claimed in claim 9 wherein each of said side members and each of said carrying members are independently movable relative to said cross member.

* * * * *